United States Patent Office 3,561,905
Patented Feb. 9, 1971

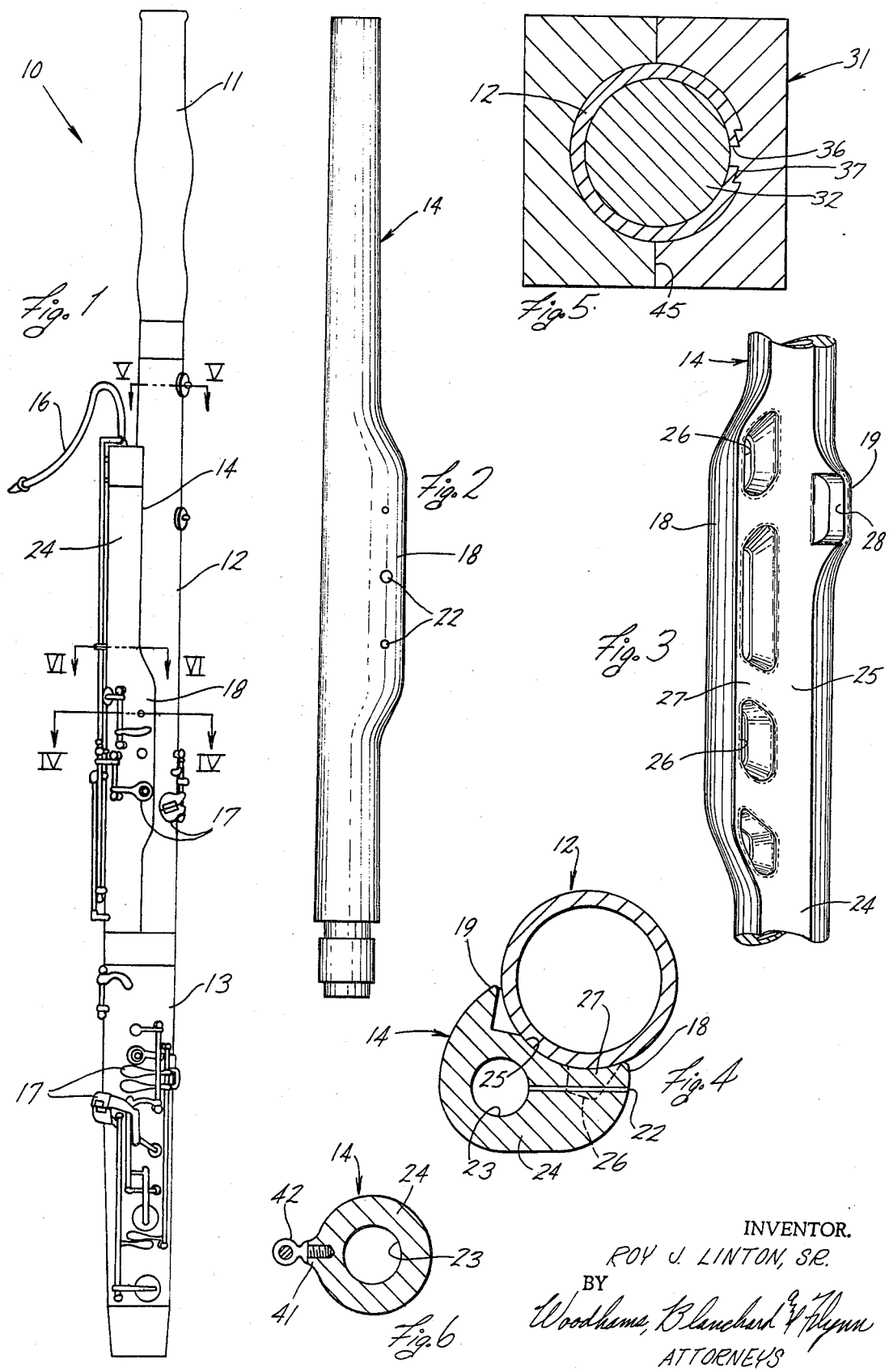

3,561,905
TENOR JOINT FOR BASSOON
Roy J. Linton, Sr., Elkhart, Ind., assignor to The Linton Company, Elkhart, Ind.
Filed Mar. 5, 1969, Ser. No. 804,398
Int. Cl. G10d 7/00
U.S. Cl. 84—380
2 Claims

ABSTRACT OF THE DISCLOSURE

A method of making a tenor joint for a bassoon, said joint having a lengthwise bore and integral wing means extending along and projecting radially away from said base, said wing means having a plurality of spaced openings extending therethrough and into communication with the bore of the joint, said wing means also having a plurality of recesses in the side thereof between pairs of openings, the joint being produced by injection molding from a thermoplastic, such as acrylonitrile butadiene styrene, which is known as Cycolon.

BACKGROUND OF THE INVENTION

This invention relates in general to a method of making joints for a bassoon and, more particularly, to the tenor or wing joint thereof.

Persons acquainted with the manufacture and use of woodwinds are well aware of the many problems which have been encountered in the selection of a suitable material for the bodies of such instruments and in the development of techniques for properly shaping such bodies. For centuries, the dominant material for the bodies of woodwind instruments has been wood. During the last century, the use of metal bodies has increased materially, and it has now become the standard material for flutes and piccolos. However, wood is still preferred for the lower voiced instruments, such as bassoons.

During approximately the last 50 years, much effort has been devoted to the use of synthetic plastic materials in forming the bodies of woodwind instruments and considerable success has been achieved. However, generally speaking, wood has been preferred over either plastic or metal materials, because of its capacity for producing a more acceptable tonal quality.

If it were not for certain inherent limitations of wood, it would undoubtedly continue to be the most dominant material used in woodwind instruments. However, for example, even the most carefully treated and carefully manufactured woodwind instrument fabricated from wood will frequently crack, shrink or warp after periods of use, even if extreme precautions are exercized in its use and care. On the other hand, certain plastic materials are capable of withstanding conditions of humidity, temperature and/or shock which, at least over an extended period of time, would irreparably damage wooden instruments.

Nevertheless, heretofore, it has been at least extremely difficult to provide plastic bodies for woodwin instruments having no irregularities, particularly in the internal surfaces thereof, even through such bodies have been fabricated with considerable care. By using existing applicable molding or other shaping methods, it has been impossible to provide the smoothness of surface, the strength in the tenons, the elimination of pits and voids, and a thin enough wall to be adequately responsive. Moreover, present molding procedures have been sufficiently inaccurate that a considerable amount of expensive finishing work has been required to complete the instruments.

Heretofore, plastic bodies for woodwind instruments have been made, insofar as I am aware, entirely by compression molding procedures. This necessitated support of the mandrel defining the bore of the body member or joint by pins which would extend through the sidewall of the body as it is formed. Accordingly, after completion of the molding operation, it has been necessary to fill the supporting pin holes with plastic, thereby creating discontinuities and material dissimilarities in the body structure, along with other incidental problems such as pits, voids and additional machining operations. In spite of the presence of these mandrel support pins, due to the fact that the material has been conventionally introduced into the mold at the side of the body member, some movement of the mandrel has occasionally occurred, thereby producing an instrument body of variable wall thickness with all of the disadvantages that such can produce in tonal quality.

It is well recognized that varying wall thicknesses, or surface irregularities, pits, obstructions and the like in the internal wall surfaces, all tend to blur tone quality or stiffle tone projection. They also obstruct the flow of air through the instrument and, accordingly, render it more difficult to play. This becomes a very serious problem in the larger instruments, such as bassoons. Thus, an inaccurately built instrument, even in the hands of an expert, lacks the capacity to speak or project the desired tone.

Heretofore, most manufacturers of woodwin instruments have used plastic bodies only on lower-priced instruments, where the customer has been willing to accept a less than completely satisfactory instrument. This way, the manufacturer has been able to avoid the additional cost required to overcome the foregoing problems, which would be necessary to produce an instrument capable of competing with the best instruments having wooden bodies. However, by changing the method of manufacturing such bodies from plastic materials, I have been able not only to eliminate the problems which have been encountered in plastic instrument bodies produced by other methods, but I have also been able to produce a woodwind instrument with a plastic body capable of matching the tonal quality, responsiveness, intonation and tonal projection of the finest instruments with wooden bodies. In addition to this, such plastic bodies have completely overcome the problems, such as checking, cracking and fragile tenons, which have been inherent in wooden bodies and, to some extent, even in previous types of plastic bodies.

Accordingly, a primary object of this invention is the provision of a process of fabricating a joint for a bassoon by injection molding a thermoplastic material wherein the inner surface, in particular, is molded in finished form requiring no other surface treatment after the molding operation is completed, and in which the wall thickness of the joint is thin enough to produce excellent tone projection and quality with response while remaining strong enough to withstand unfavorable conditions of weather and shock which would damage wood.

A further object of this invention is the provision of a method, as aforesaid, for forming a tenor joint for a bassoon having integral wing means and a minimum amount of weight.

A further object of this invention is the provision of a tenor joint for a bassoon, as aforesaid, having a smooth, shiny inner surface, an accurate wall thickness, minimum weight, and adequate strength to resist abusive treatment.

A further object of this invention is the provision of a tenor joint for a bassoon, as aforesaid, having integral and large wall thicknesses at selected locations for mounting key-supporting posts, and having no voids, pits and other obstructions along the wall surfaces thereof.

A further object of this invention is the provision of a tenor joint, as aforesaid, in which the wing means has recesses in the lateral surfaces thereof for minimizing the weight thereof, said wing joint being made by injection molding so that the inner surface thereof and the pad seats are in smooth, finished form when the molding operation is completed.

Other objects and purposes of this invention will become apparent to persons familiar with this type of equipment upon reading the following descriptive material and examining the accompanying drawings, in which:

FIG. 1 is a side elevational view of a bassoon embodying the invention.

FIG. 2 is a side elevational view of the tenor joint of said bassoon with the keys removed.

FIG. 3 is a fragment of FIG. 2 showing the reverse side thereof.

FIG. 4 is a sectional view taken along the line IV—IV in FIG. 1.

FIG. 5 is a sectional view taken along the line V—V in FIG. 1 as it appears in a mold.

FIG. 6 is a sectional view taken along the line VI—VI in FIG. 1.

For convenience in description, the terms "upper," "lower" and words of similar import will have reference to the bassoon and joints thereof as appearing in FIG. 1. The term "inner," "outer" and derivatives thereof will have reference to the geometric center of the bassoon and parts thereof. The terms "exterior" and "interior" will have reference to the corresponding surfaces of the various tubular joints in the bassoon.

SUMMARY OF THE INVENTION

The objects and purposes of the invention, including those set forth above, have been met by providing a bassoon having a wing joint fabricated by injection molding with integral wings having lateral recesses therein for reducing to a minimum the weight of said wing joint. Some of the objects have been met by providing a method of injection molding said wing joint so that minimum wall thicknesses can be provided while maintaining above-average resistance to damage from weather changes and from shock.

DETAILED DESCRIPTION

The bassoon 10 illustrated in FIG. 1 is comprised of a bell joint 11, bass joint 12, boot 13, tenor joint 14 and bocal 16. The bassoon has a standard system of keys 17 which may be conventional as to location, size and arrangement.

The tenor joint 14 has, as shown in FIG. 3, a pair of integral wings 18 and 19 approximately midway between the upper and lower ends thereof. The key wing 18 is provided with a plurality, here three, of tone openings 22, which extend transversely therethrough into communication with the lengthwise bore 23 (FIG. 4) of the cylindrical body 24 of said tenor joint 14.

Said key wing 18 also has, as shown in FIG. 3, a plurality of recesses 26 which are disposed between each pair of adjacent openings 22 and, in this embodiment, above and below the upper and lower tone openings, respectively. Accordingly, the recesses provide three integral, solid bridges 27 across the key wing 18 through which the tone openings 22 are drilled.

As shown in FIG. 4, the brace wing 19 cooperates with the key wing 18 to accurately position the tenor joint 14 with respect to the bass joint 12 and prevent relative rotation of the tenor joint 14 around its central axis with respect to said bass joint 12.

The external surface of the body 24 may be provided with a lengthwise extending, concave surface 25 which defines with the adjacent surfaces on the wings 18 and 19 a portion of a cylinder having the same radius as the external surface of the bass joint 12, to facilitate the nesting engagement therebetween.

The brace wing 19 has a recess 28 for the purpose of weight reduction and without reducing in the least its ability to perform its intended function. It will be noted that the recesses 26 and 28 open closely adjacent the external surface of the base joint 12 so that they cannot be seen when the bassoon is in its assembled condition of FIG. 1. Accordingly, the said recesses do not affect the conventional appearance of the external surface of the tenor joint 14, which could be objectionable. Moreover, this reduction in weight, by means of recesses, does not in any way interfere with the conventional performance of the tenor joint 14. However, the elimination of excess materials reduces the cost of the joint and, at the same time, reduces the amount of material which is resonated in sympathetic response to normal sound projection by the instrument.

The tenor joint 14, for example, is fabricated by injecting plastic material into one end of an elongated mold 31 through which a mandrel 32 extends so that the cylindrical body 24 is formed between the mandrel and the mold. The mandrel 32 is provided with a slight upwardly converging taper so that it can be withdrawn from the molded cylindrical body 24 after the molding operation is completed. The external surface of the cylindrical body 24 is also divergently tapered downwardly to maintain a substantially constant wall thickness. However, these relationships may be varied somewhat as desired.

The tone opening 36 (FIG. 5) is molded to provide a smooth, completely finished pad seat 37 which is ready for engagement by a key pad as soon as the molding operation is completed. The mandrel 32 and the mold 31 produce smooth, shiny surfaces on the cylindrical body 24 where they engage same during the molding operation. Thus, no further surface polishing is required, except to remove a fine flash which may form at the parting line of the mold.

In the preferred embodiment of the invention, the tenor joint 14, as well as the other joints of the bassoon, is fabricated by said injection molding from acrylonitrile butadiene styrene, which is a terpolymer having a distortion tempearture of approximately 200° F. and softening point of 350° F. However, it will be recognized that other thermoplastics having the same or better physical characteristics for this type of usage may be used if desired and such is fully contemplated.

As shown in FIG. 6, the cylindrical body 24 may be provided with portions of additional thickness 41 for reception of the threaded end of a key-supporting post 42 without providing a corresponding, excessive wall thickness in the remainder of the cylindrical body 24. Thus, by this means, the wall thickness of the cylindrical body can be maintained at a minimum commensurate with adequate strength while still providing integral portions of additional thickness to accommodate the mounting of the posts.

The parting line of the mold is indicated at 45 in FIG. 5 and it will be seen that the portions of the mold providing the recesses in the two wings 18 and 19 can be arranged in one mold half and drawn from the finished product without difficulty.

From the foregoing descriptive material relative to the structure and method of the invention, the operation of the bassoon, and specifically the tenor joint thereof, will be apparent to persons skilled in this art. Briefly, to summarize, the tenor joint when assembled on the bassoon will have the same appearance as existing tenor joints with the exception of the smooth and shiny surface which is provided without performing additional finishing operations, particularly on the internal surface, after the molding operation is completed. The big differences between applicant's improved tenor joint and existing plastic tenor joints will be in its lighter weight, its reduced cost of manufacture, its greater responsiveness with less effort, its greater strength, an overall improved tonal quality, resulting from an extremely smooth surface defining its internal bore, and less resistance to sympathetic resonance, due to the thinner wall.

Although a particular preferred embodiment of the invention has been disclosed above in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a bassoon, a tenor joint comprising:
   substantially cylindrical barrel means having a substantially coaxial and tapered bore defined by a smooth and shiny surface;
   integral wing means on said barrel means extending lengthwise along and projecting radially from said barrel means, said wing means having therethrough a plurality of transverse, spaced openings communicating with and extending away from said bore;
   means defining a plurality of spaced recesses in a side of said wing means, each recess being located between an adjacent pair of said openings, whereby the mass of said wing means is minimized.

2. A tenor joint according to claim 1, wherein said barrel means and said wing means are simultaneously injection molded from acrylonitrile butadiene styrene.

References Cited

UNITED STATES PATENTS

| 2,730,003 | 1/1956 | Loney | 84—380 |
| 3,094,032 | 6/1963 | Linton | 84—380 |
| 3,127,806 | 4/1964 | Fox | 84—380 |
| 3,308,706 | 3/1967 | Brilhart | 84—380 |

RICHARD B. WILKINSON, Primary Examiner

J. F. GONZALES, Assistant Examiner